C. MACHACEK, Jr.
DIMMER FOR WIND SHIELDS.
APPLICATION FILED JULY 28, 1919.
1,332,225.
Patented Mar. 2, 1920.
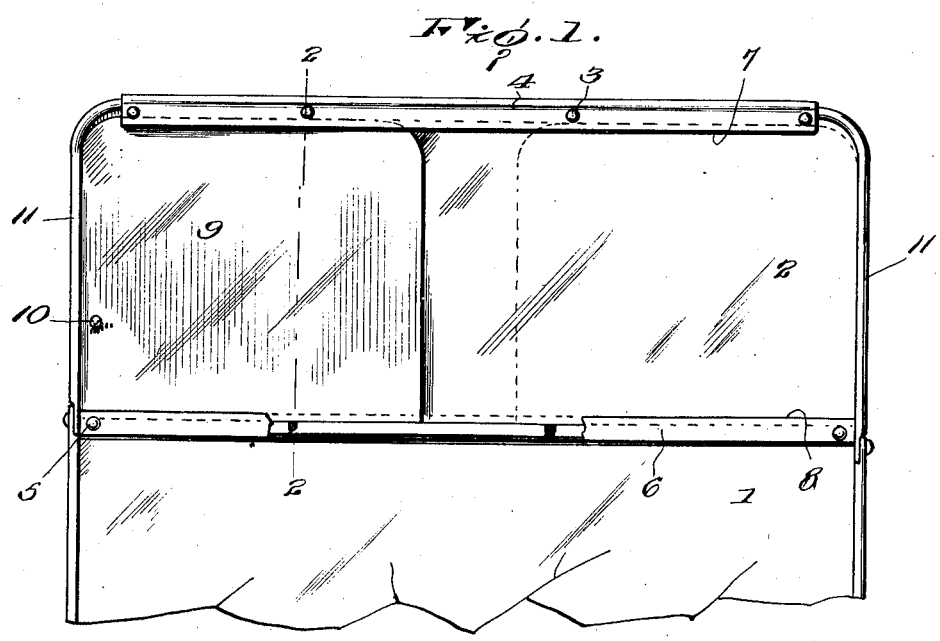
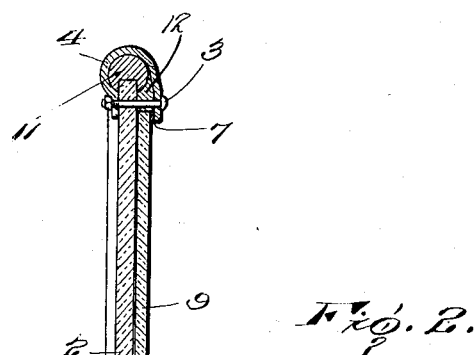
Inventor:
C. Machacek, Jr.
by 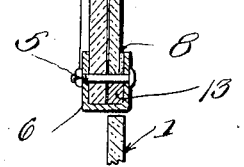

UNITED STATES PATENT OFFICE.

CHARLES MACHACEK, JR., OF TABOR, SOUTH DAKOTA.

DIMMER FOR WIND-SHIELDS.

1,332,225.   Specification of Letters Patent.   Patented Mar. 2, 1920.

Application filed July 28, 1919. Serial No. 313,702.

*To all whom it may concern:*

Be it known that I, CHARLES MACHACEK, Jr., a citizen of the United States, residing at Tabor, R. 21, in the county of Yankton and State of South Dakota, have invented certain new and useful Improvements in Dimmers for Wind-Shields, of which the following is a specification.

The invention forming the subject matter of this application is a dimmer for automobile wind shields, that is to say a device for obscuring or dimming the sharp rays of light from passing through the wind shield to the eyes of the driver of the automobile.

The leading object of the invention is the production of a dimmer capable of instant operation for bringing the dimmer into position with reference to the wind shield to obscure the rays of light and which may be as readily moved to inoperative position when not required, such dimmer being capable of application to wind shields in general use or at the time of manufacture and which can be produced at such a price as to render its use entirely desirable and practical.

With this object in view, the invention in its broadest sense may be said to consist in the combination of a wind shield and a shiftable dimmer element adapted to be moved into and out of service position, and further the invention resides in certain details of construction and combination of parts substantially as shown, described and claimed herein.

In the accompanying drawings, I have illustrated a structure devised according to the best mode I have so far conceived for carrying my invention into effect, and to which drawing reference is made for a more complete understanding of my invention.

Figure 1 is a front elevation of a wind shield equipped with my dimmer, parts of the wind shield frame being broken away, the dimmer being shown in full lines and in position for operation and in dotted lines as out of operative position, and Fig. 2 is a sectional view taken on the line 2—2 of Fig. 1.

My improvement is shown in connection with the stationary member 1 and the hinged member 2 of a wind shield and is applied preferably to the hinged member by reason of the fact that such member comes within the line of vision of the operator of the automobile.

In carrying my invention into effect I secure to the upper edge of the wind shield, by means of suitable fastenings 3, a cleat 4 and to the lower portion of the wind shield, by means of fastenings 5, a cleat 6, thus forming a means which embraces the section 2 of the wind shield and provides guides 7 and 8 for the sliding dimmer member 9, as most clearly shown in Fig. 2.

The dimmer is made of glass or other suitable material which may be of any color to suit the desires of the user, and such dimmer is provided with a handle 10 to permit the driver to readily slide the dimmer into operative position, as shown in Fig. 1 in full lines, or to inoperative position, as shown in dotted lines, the frame 11 of the wind shield serving as a stop to limit the movement of the dimmer.

As illustrated in Fig. 2, the cleats 4 and 6 are extended on opposite sides of the glass 2 and are in firm engagement with the front side of the glass for bracing the same. Between the rear sides of the cleats 4 and 6 and the adjacent side of the glass 2 are upper and lower spacing elements 12 and 13 which form guideways for the reception of which the upper and lower edges of the colored glass 9. The colored glass 9 is flatly in contact with the transparent glass 2 and serves to strengthen and embrace the same.

It will thus be understood that practically no change is required in the construction of the wind shield and that the dimmer consists of a flat element which slides back and forth across the wind shield to accomplish the purpose of this invention, and it will also be understood that the dimmer may be made of any material desired and of any size to suit the requirements for which it is intended.

Having thus described the invention, what I claim is:—

The combination with a wind shield having a frame and a glass arranged within the frame, of cleats secured to the upper and lower sides of the wind shield and extending on opposite sides of said glass, spacing elements arranged between the inner sides of said cleats and the upper and lower edge portions of the glass thereby forming upper and lower guideways, and a rigid sheet of translucent material arranged flatly in contact with the rear side of said glass and having its upper and lower edge portions slidably arranged in said upper and lower guideways, said sheet of translucent material being of a lesser width than said glass and being provided with an operating handle.

In testimony whereof I affix my signature.

CHARLES MACHACEK, Jr. [L. s.]